US010090798B2

(12) United States Patent
Watanabe et al.

(10) Patent No.: US 10,090,798 B2
(45) Date of Patent: Oct. 2, 2018

(54) MACHINE LEARNING APPARATUS AND METHOD LEARNING PREDICTED LIFE OF POWER DEVICE, AND LIFE PREDICTION APPARATUS AND MOTOR DRIVING APPARATUS INCLUDING MACHINE LEARNING APPARATUS

(71) Applicant: FANUC CORPORATION, Yamanashi (JP)

(72) Inventors: Masato Watanabe, Yamanashi (JP); Yasuyuki Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/293,682

(22) Filed: Oct. 14, 2016

(65) Prior Publication Data
US 2017/0117841 A1    Apr. 27, 2017

(30) Foreign Application Priority Data
Oct. 26, 2015  (JP) .................................. 2015-210127

(51) Int. Cl.
*H02P 29/68* (2016.01)
*G06N 5/04* (2006.01)
(Continued)

(52) U.S. Cl.
CPC ............. *H02P 29/68* (2016.02); *G06N 5/045* (2013.01); *G06N 99/005* (2013.01); *H02P 6/14* (2013.01); *H02P 27/08* (2013.01)

(58) Field of Classification Search
CPC ...... G06N 5/045; G06N 99/005; H02P 27/08; H02P 29/68
See application file for complete search history.

(56) References Cited

U.S. PATENT DOCUMENTS

| 6,384,512 B1 * | 5/2002 | Maeda ................ F02D 41/2096 310/316.03 |
| 7,301,296 B1 * | 11/2007 | Discenzo ........... G05B 19/4063 318/400.01 |

(Continued)

FOREIGN PATENT DOCUMENTS

| CN | 101087125 A | 12/2007 |
| CN | 101299577 A | 11/2008 |

(Continued)

OTHER PUBLICATIONS

Untranslated Decision to Grant a Patent mailed by Japan Patent Office (JPO) for Application No. JP 2015-210127 dated Aug. 23, 2016 3 pages.

(Continued)

*Primary Examiner* — Muhammad S Islam
(74) *Attorney, Agent, or Firm* — Fredrikson & Byron, P.A.

(57) ABSTRACT

A machine learning apparatus that learns predicted life of a power device of a motor driving apparatus converting DC power into AC power by a switching operation of the power device to supply the AC power to an AC motor includes: a state observation unit that observes a state variable constituted by data regarding the number of times of switching of the power device, data regarding junction temperature of the power device, and data regarding presence or absence of a failure of the power device; and a learning unit that learns the predicted life of the power device in accordance with a training data set defined by the state variable.

13 Claims, 7 Drawing Sheets

(51) Int. Cl.
 *G06N 99/00* (2010.01)
 *H02P 6/14* (2016.01)
 *H02P 27/08* (2006.01)

(56) References Cited

U.S. PATENT DOCUMENTS

| | | | | |
|---|---|---|---|---|
| 2005/0071090 | A1* | 3/2005 | Katou | H02M 7/48 |
| | | | | 702/34 |
| 2006/0221527 | A1* | 10/2006 | Jacobson | G01K 7/42 |
| | | | | 361/100 |
| 2013/0328596 | A1* | 12/2013 | Zoels | H03K 17/18 |
| | | | | 327/109 |
| 2014/0125366 | A1 | 5/2014 | Thogersen et al. | |
| 2015/0015266 | A1 | 1/2015 | Zhao et al. | |

FOREIGN PATENT DOCUMENTS

| | | |
|---|---|---|
| DE | 102013012133 A1 | 1/2015 |
| DE | 102013219243 A1 | 3/2015 |
| JP | 2011196703 A | 10/2011 |
| JP | 20143792 A | 1/2014 |

OTHER PUBLICATIONS

English machine translation of Decision to Grant a Patent mailed by Japan Patent Office (JPO) for Application No. JP 2015-210127 dated Aug. 23, 2016 3 pages.

English Abstract for Japanese Publication No. 2011-196703, published Oct. 6, 2011, 1 pg.

English Abstract for Japanese Publication No. 2014-003792 A, published Jan. 9, 2014, 1 pg.

English Abstract for Chinese Publication No. 101299577 A, published Nov. 5, 2008, 1 pg.

English Abstract for German Publication No. 102013219243 A1, published Mar. 26, 2015, 3 pgs.

English Abstract for German Publication No. 102013012133 A1, published Jan. 22, 2015, 2 pgs.

English Abstract and Machine Translation for Chinese Publication No. 101087125 A, published Dec. 12, 2007, 9 pgs.

* cited by examiner

MACHINE LEARNING APPARATUS AND METHOD LEARNING PREDICTED LIFE OF POWER DEVICE, AND LIFE PREDICTION APPARATUS AND MOTOR DRIVING APPARATUS INCLUDING MACHINE LEARNING APPARATUS

BACKGROUND OF THE INVENTION

1. Field of the Invention

The present invention relates to a machine learning apparatus and method learning predicted life of a power device, and a life prediction apparatus and motor driving apparatus including the machine learning apparatus.

2. Description of the Related Art

In a motor driving apparatus which drives AC motors within a machine tool, a forging machine, an injection molding machine, an industrial machine, or various robots, an inverter converts DC power into AC power to supply driving power for driving an AC motor. The inverter is implemented in a bridge circuit of a switching unit including a power device (solid-state-switching device) and a diode connected in inverse parallel to it, such as a PWM inverter, and converts DC power into AC power by ON/OFF driving in the power device and outputs the AC power to the AC motor side.

In a field using such a motor driving apparatus, in order to prevent a decline in operating efficiency and a serious accident, life of a power device is predicted, and a power device is replaced before the power device becomes unoperatable due to the end of the life, on the basis of the prediction result.

As described in e.g., Japanese Laid-open Patent Publication No. 2011-196703, a method is known in which entire operating temperature range of a semiconductor device configured by a power semiconductor device is divided into a plurality of temperature sections, a cycle number is computed by using a value which is weighted to a power cycle number in a set base temperature difference in each temperature section, and an accumulation damage is computed by using a minor rule based on the cycle numbers each computed, between the divided temperature sections to predict the life.

Life of a power device in an inverter in a motor driving apparatus changes depending on environmental conditions, such as operating conditions of a motor driving apparatus and ambient air temperature, and therefore it is not easy to predict the life accurately. When the life of a power device cannot be predicted accurately, the operator may miss the timing for replacement of a power device, which may result in a decline in operating efficiency and a serious accident. In addition, it may result in unnecessary replacement of a power device. Therefore, it is important to be able to predict the end of life of a power device.

SUMMARY OF INVENTION

In view of the problems as described above, it is an object of the invention to provide a machine learning apparatus and method which can accurately easily predict predicted life of a power device, and a life prediction apparatus and motor driving apparatus including the machine learning apparatus.

In order to achieve the above-described object, a machine learning apparatus that learns predicted life of a power device of a motor driving apparatus converting DC power into AC power by a switching operation of the power device to supply the AC power to an AC motor, includes: a state observation unit that observes a state variable constituted by data regarding the number of times of switching of the power device, data regarding junction temperature of the power device, and data regarding presence or absence of a failure of the power device; and a learning unit that learns the predicted life of the power device in accordance with a training data set defined by the state variable.

The junction temperature of the power device may be calculated on the basis of temperature of a fin cooling the power device, ambient air temperature of the motor driving apparatus, a value of current supplied to the AC motor from the motor driving apparatus, and a value of voltage applied to the AC motor from the motor driving apparatus.

The learning unit may include: a reward computation unit that computes a reward on the basis of the number of times of switching of the power device, and the presence or absence of the failure of the power device; and a function update unit that updates, on the basis of the state variable and the reward, functions for computing the predicted life of the power device.

The reward computation unit may decrease the reward when the number of times of switching of the power device exceeds a specified number of times.

The reward computation unit may decrease the reward when a failure of the power device occurs under a state in which the number of times of switching of the power device does not exceed the specified number of times.

The function update unit may update the functions for computing the predicted life of the power device on the basis of the state variable and the reward in accordance with a neural network model.

The learning unit includes: an error computation unit that computes an error on the basis of the state variable; and a learning model update unit that updates a learning model for computing the predicted life of the power device, on the basis of the state variable and the error.

The learning unit may be configured to learn the predicted life of the power device in accordance with the training data set acquired for a plurality of motor driving apparatuses.

A life prediction apparatus for a power device in a motor driving apparatus, the life prediction apparatus including the above-described machine learning apparatus, in which the life prediction apparatus further includes a decision-making unit that computes the predicted life of the power device, on the basis of a result of learning by the learning unit in accordance with the training data set, in response to an input of the present state variable.

The life prediction apparatus further includes a notification unit that notifies an operator of the predicted life computed by the decision-making unit.

The life prediction apparatus further includes a notification part that notifies an operator to replace of the power device or replacement of the motor driving apparatus on the basis of the predicted life computed by the decision-making unit.

The learning unit may be configured to re-learn and update the predicted life of the power device in accordance with an additional training data set defined by the present state variable.

A motor driving apparatus includes: the above-described life prediction apparatus; a power supply unit that converts DC power into AC power by a switching operation of the power device to supply the AC power to an AC motor; a number of times of switching acquisition unit that acquires data regarding the number of times of switching on the basis of a switching command to the power device; and a failure determination unit that acquires data regarding the presence or absence of the failure of the power device on the basis of the switching command to the power device and the AC power that is output from the power supply unit.

The motor driving apparatus may further include a temperature calculation unit calculating junction temperature of the power device on the basis of the temperature of the fin cooling the power device, the ambient air temperature of the motor driving apparatus, the value of current supplied to the AC motor from the motor driving apparatus, and the value of voltage applied to the AC motor from the motor driving apparatus.

The motor driving apparatus may further include a temperature sensor measuring junction temperature of the power device.

A machine learning method that learns predicted life of a power device of a motor driving apparatus converting DC power into AC power by a switching operation of the power device to supply the AC power to an AC motor includes: a state observation step observing a state variable constituted by data regarding the number of times of switching of the power device, data regarding junction temperature of the power device, and data regarding presence or absence of a failure of the power device; and a learning step learning the predicted life of the power device in accordance with a training data set defined by the state variable.

BRIEF DESCRIPTION OF THE DRAWINGS

The invention will be understood more clearly by referring to the following accompanying drawings.

DETAILED DESCRIPTION

A machine learning apparatus and method learning predicted life of a power device, and a life prediction apparatus and motor driving apparatus including the machine learning apparatus will be described below with reference to the drawings. It should be understood that the present invention is not limited to the drawings or embodiments described below.

Figure 1:
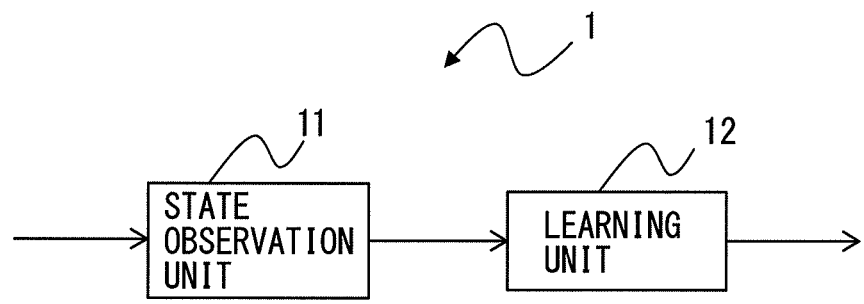
FIG. 1 is a principle block diagram of a machine learning apparatus according to an embodiment.

FIG. 1 is a principle block diagram of a machine learning apparatus according to an embodiment. The same reference numerals in different drawings denote components having the same functions hereinafter.

A motor driving apparatus for driving an AC motor converts DC power into AC power by an inverter to supply driving power for driving the AC motor. The inverter is implemented in a bridge circuit of a switching unit including a power device (solid-state-switching device) and a diode connected in inverse parallel to it, such as a PWM inverter, and converts DC power into AC power by ON/OFF driving in the power device and outputs the AC power to the AC motor side. The machine learning apparatus 1 according to the embodiment is configured to learn predicted life of a power device of the motor driving apparatus which converts DC power into AC power by a switching operation of the power device and supplies the AC power to the AC motor. The life of the power device (the number of times of switching) depends on a difference (power cycle) between junction temperature at the time of operation of the power device and base temperature. The junction temperature of the power device is temperature at a joining section between a power semiconductor chip in the power device and a bonding part. The base temperature is temperature at a part thermally connecting with the outside for cooling of the power device, and is also called as fin temperature. The difference between the junction temperature and the base temperature changes depending on operating conditions of the motor driving apparatus and ambient air temperature. In the present invention, the machine learning apparatus 1 observes the number of times of switching of the power device, the junction temperature of the power device, and the presence or absence of the failure of the power device, and make these data into database as an action value table, thereby predicting the life of the power device from data regarding a difference between previous junction temperature and the base temperature, and failure data.

The machine learning apparatus 1 includes a state observation unit 11 and a learning unit 12. The machine learning apparatus 1 may be embedded in the motor driving apparatus performing drive control of the AC motor, and in this case, the machine learning apparatus 1 performs machine learning using a processor of the motor driving apparatus. Alternatively, the machine learning apparatus 1 may be configured as a digital computer connected to the motor driving apparatus through a network. Alternatively, the machine learning apparatus 1 may be provided on a cloud server, and in this case, the machine learning apparatus 1 is connected to the motor driving apparatus through a network.

The state observation unit 11 observes a state variable constituted by data regarding the number of times of switching of the power device, data regarding junction temperature of the power device, and data regarding presence or absence of a failure of the power device.

The data regarding the number of times of switching of the power device is generated on the basis of a switching command (for example, a PWM switching signal) for ON/OFF driving of the power device generated by the motor driving apparatus.

The data regarding the junction temperature of the power device is obtained by calculation based on temperature of a fin cooling the power device, ambient air temperature of the motor driving apparatus, a value of current supplied to the AC motor from the motor driving apparatus, and a value of voltage applied to the AC motor from the motor driving apparatus. The calculating method of the junction temperature of the power device is described below. Alternatively, the data regarding the junction temperature of the power device may be acquired by a temperature sensor installed close to the power device.

The data regarding the presence or absence of the failure of the power device can be obtained, for example, by monitoring whether AC power corresponding to the switching command is output from the power supply unit in the motor driving apparatus in a situation in which the switching command generated by the motor driving apparatus has been provided to the power device. For example, a current detection unit detects current flowing into the AC motor from the power supply unit in the motor driving apparatus, it may be determined that "there is no failure of the power device" when the current detected value corresponds to the switching command output from the motor driving apparatus, and that "there is a failure of the power device" when the current detected value is close to zero while the switching command has been provided or when the current detected value is an abnormally large value which is unexpectable from the switching command. Alternatively, the operator who finds or is notified the failure of the power device operates an input device himself/herself to input data indicating failure occurrence of the power device into the state observation unit 11.

In this way, the state observation unit 11 observes the state variable constituted by the data regarding the number of times of switching of the power device, the data regarding junction temperature of the power device, and the data regarding presence or absence of a failure of the power device. When the machine learning apparatus 1 is connected to the motor driving apparatus through a network, or is provided on a cloud server, the state observation unit 11 observes the state variable through a network. Alternatively, when the machine learning apparatus 1 is embedded in the motor driving apparatus, the state variable is observed on the basis of internal data of control software stored in the motor driving apparatus and/or the data output from the various sensors connected to the motor driving apparatus.

The learning unit 12 learns the predicted life of the power device in accordance with a training data set generated on the basis of the state variable observed by the state observation unit 11. Note that the training data set may be acquired from a plurality of motor driving apparatuses, and in this case, the learning unit 12 learns the predicted life of the power device in accordance with the training data set acquired for the plurality of motor driving apparatuses.

Figure 2:
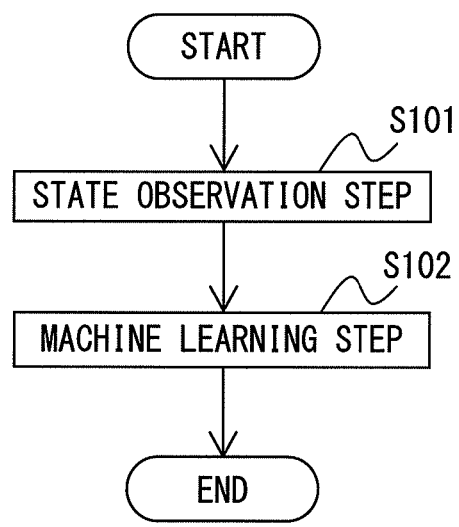
FIG. 2 is a flowchart illustrating an operational flow of a machine learning method according to the embodiment.

FIG. 2 is a flowchart illustrating an operational flow of a machine learning method according to the embodiment. A machine learning method that learns predicted life of a power device of a motor driving apparatus converting DC power into AC power by a switching operation of the power device to supply an AC power to the AC motor includes a state observation step S101 and a learning step S102.

The state observation step S101 is executed by the state observation unit 11, i.e., the state observation unit 11 observes a state variable constituted by data regarding the number of times of switching of the power device, data regarding junction temperature of the power device, and data regarding presence or absence of a failure of the power device.

The learning step S102 is executed by the learning unit 12, i.e., the learning unit 12 learns the predicted life of the power device in accordance with the training data set generated on the basis of the state variable observed by the state observation unit 11.

The learning unit 12 may employ any type of learning algorithm. The machine learning apparatus 1 has functions of extracting, from a set of data items input into the apparatus by an analysis, a useful rule, knowledge representation, a determination criterion included in the set of data items, outputting the determination result, and learning knowledge. Although there are various techniques, the techniques are generally classified into "supervised learning", "unsupervised learning", and "reinforcement learning". In addition, for implementing these techniques, there is a technique which learns extraction of the feature quantity itself, called "deep learning". Such machine learning (the machine learning apparatus 1) is implemented by applying, for example, GPGPU (General-Purpose computing on Graphics Processing Units), a large-scale PC cluster, or the like.

The application of reinforcement learning will be illustrated below with reference to FIG. 3 and FIG. 4 as an example. The "supervised learning", the "unsupervised learning", or the like are described later.

Figure 3:
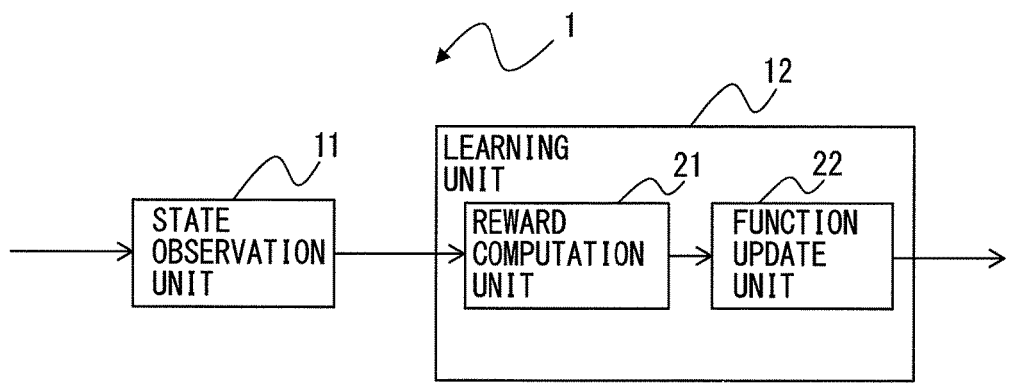
FIG. 3 is a principle block diagram illustrating a machine learning apparatus to which reinforcement learning is applied according to the embodiment.

FIG. 3 is a principle block diagram illustrating the machine learning apparatus to which reinforcement learning is applied according to the embodiment. The learning unit 12 includes a reward computation unit 21 and a function update unit 22. Since the components other than the reward computation unit 21 and the function update unit 22 are substantially the same as the components illustrated in FIG. 1, the same reference numerals are given to the same components and the detailed description on the components is omitted.

The reward computation unit 21 computes a reward on the basis of the number of times of switching of the power device and the presence or absence of the failure of the power device, which are observed by the state observation unit 11. For example, the reward computation unit 21 may be configured to decrease the reward when the number of times of switching of the power device observed by the state observation unit 11 exceeds a specified number of times. For example, the reward computation unit 21 may be configured to decrease the reward when a failure of the power device occurs under a state in which the number of times of switching of the power device does not exceed the specified number of times. The above-described specified number of times is a "durable number of times of switching" corresponding to life of a power device, and is defined for each power device.

The function update unit 22 updates functions (an action value table) for computing the predicted life of the power device, on the basis of the state variable observed by the state observation unit 11 and the reward computed by the reward computation unit 21. The updating method of functions (action value table) is described below.

Figure 9:
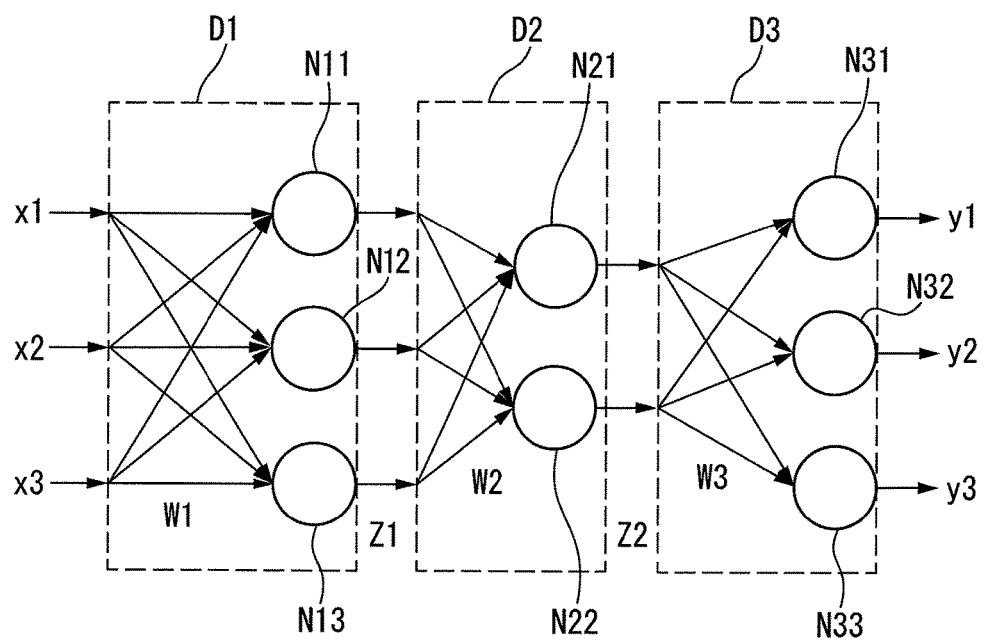
FIG. 9 is an exemplary diagram illustrating a neural network including weights of three layers, D1 to D3.

The learning unit 12 may compute the state variable observed by the state observation unit 11 with a multilayer structure, and update functions (action value table) in real time. For example, the function update unit 22 may update the functions (action value table) for computing the predicted life of the power device, on the basis of the state variable observed by the state observation unit 11 and the reward computed by the reward computation unit 21 in accordance with a neural network model. For example, a multilayer neural network as illustrated in FIG. 9 described below can be used for a method for computing a state variable with the multilayer structure.

Figure 4:
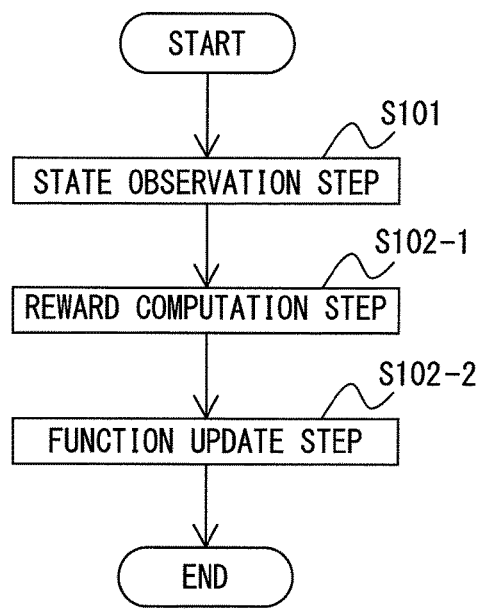
FIG. 4 is a flowchart illustrating an operational flow of a machine learning method to which reinforcement learning is applied according to the embodiment.

FIG. 4 is a flowchart illustrating an operational flow of a machine learning method to which reinforcement learning is applied according to the embodiment.

First, in the state observation step S101, the state observation unit 11 observes a state variable constituted by data regarding the number of times of switching of the power device, data regarding junction temperature of the power device, and data regarding presence or absence of a failure of the power device.

Subsequently, in a reward computation step S102-1, the reward computation unit 21 computes a reward on the basis of the number of times of switching of the power device and the presence or absence of the failure of the power device observed by the state observation unit 11.

Subsequently, in a function update step S102-2, the function update unit 22 updates the functions (active value table) for computing the predicted life of the power device on the basis of the state variable observed by the state observation unit 11 and the reward computed by the reward computation unit 21.

Next, a life prediction apparatus including the above-described machine learning apparatus and a motor driving apparatus including the life prediction apparatus are described.

Figure 5:
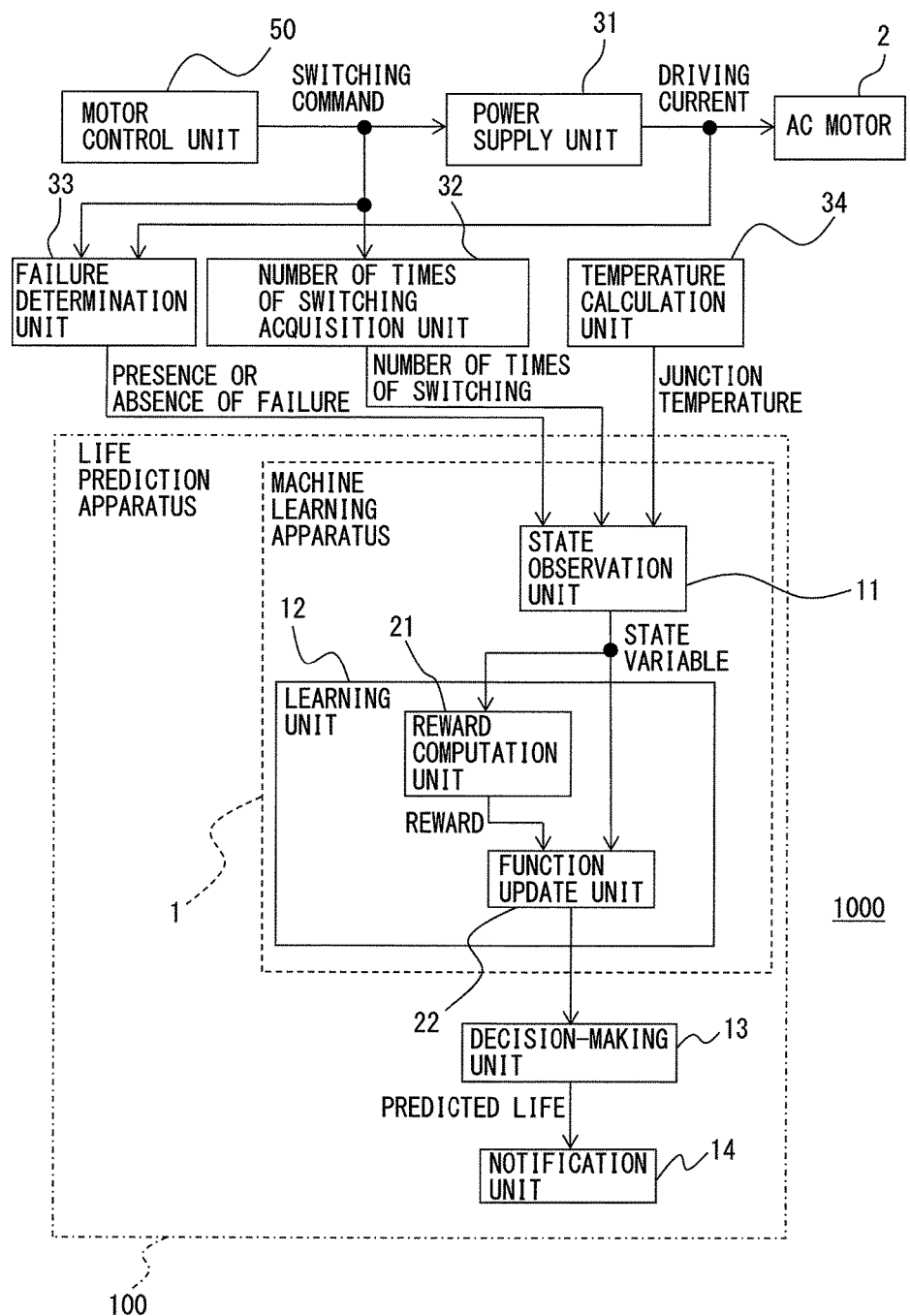
FIG. 5 is a principle block diagram illustrating a life prediction apparatus including the machine learning apparatus to which reinforcement learning is applied, and a motor driving apparatus including the life prediction apparatus, according to the embodiment.

FIG. 5 is a principle block diagram illustrating the life prediction apparatus including the machine learning apparatus to which reinforcement learning is applied, and the motor driving apparatus including the life prediction apparatus, according to the embodiment. Control of the AC motor 2 with the motor driving apparatus 1000 is described below. The type of AC motor 2 may not be limited to the present invention, and the AC motor 2 may be an induction motor or a synchronous motor.

The life prediction apparatus 100 of the power device in the motor driving apparatus 1000 includes the machine learning apparatus 1, a decision-making unit 13, and a notification unit 14. The motor driving apparatus 1000 includes the life prediction apparatus 100, a power supply unit 31, a number of times of switching acquisition unit 32, a failure determination unit 33, a temperature calculation unit 34, and a motor control unit 50. Although not depicted in the drawing, a data output part outputting data regarding the predicted life decided by the decision-making unit 13 may be additionally provided.

The motor control unit 50 generates, on the basis of control software stored therein, the switching command for controlling speed, torque or a rotor position of the AC motor 2, by using information such as a predetermined speed command, an operation program for the AC motor 2, AC current and/or AC voltage output from the power supply unit 31, and rotor rotational speed and/or a rotor position of the AC motor 2. A generation method of the switching command performed by the motor control unit 50 does not especially limit the present invention, and a known generation method, for example, a triangle wave comparison PWM method, may be employed.

On the basis of the switching command generated in the motor control unit 50, the power supply unit 31 controls the switching operation of the power device, to convert DC power into AC power, and supplies the AC power to the AC motor. A PWM inverter may be employed as the power supply unit 31, for example. The PWM inverter is implemented in a bridge circuit of a power device and a diode connected in inverse parallel to it, and performs PWM control of the switching operation of the power device on the basis of the switching command generated in the motor control unit 50. Note that, although not depicted in the drawing, a rectifier which converts AC power supplied from the AC power supply side into DC power and outputs the DC power to the DC link is provided on the DC link which is a DC side of the power supply unit 31 configured by the PWM inverter. The inverter in power supply unit 31 converts DC power supplied from the DC link side into three-phase AC power having desired voltages and frequencies for driving the AC motor 2 by causing the internal switching device to perform a switching operation on the basis of the switching command received from the motor control unit 50. The AC motor 102 thus operates on the basis of the variable-voltage and -frequency three-phase AC power supplied.

The number of times of switching acquisition unit 32 obtains the data regarding the number of times of switching on the basis of the switching command for ON/OFF driving of the power device generated by the motor control unit 50.

The failure determination unit 33 obtains the data regarding the presence or absence of the failure of the power device on the basis of the switching command for the power device generated by the motor control unit 50 and AC power output from the power supply unit 31. More specifically, the failure determination unit 33 can determine the presence or absence of the failure of the power device by monitoring whether AC power corresponding to the switching command has been output from the power supply unit 31. For example, a current detection unit (not depicted) detects current flowing into the AC motor 2 from the power supply unit 31, may determine that "there is no failure of the power device" when the current detected value corresponds to the switching command output from the motor control unit 50, and that "there is a failure of the power device" when the current detected value is close to zero while the switching command has been provided or when the current detected value is an abnormally large value which is unexpectable from the switching command. Alternatively, the operator who finds or is notified the failure of the power device operates an input device himself/herself to directly input data indicating failure occurrence of the power device into the state observation unit 11 without intervening the failure determination unit 33.

The temperature calculation unit 34 calculates the junction temperature of the power device on the basis of the temperature of the fin cooling the power device, the ambient air temperature of the motor driving apparatus 1000, the value of current supplied to the AC motor 2 from the motor driving apparatus 1000, and the value of voltage applied to the AC motor 2 from the motor driving apparatus 1000, and this is described with reference to FIG. 6.

Figure 6:
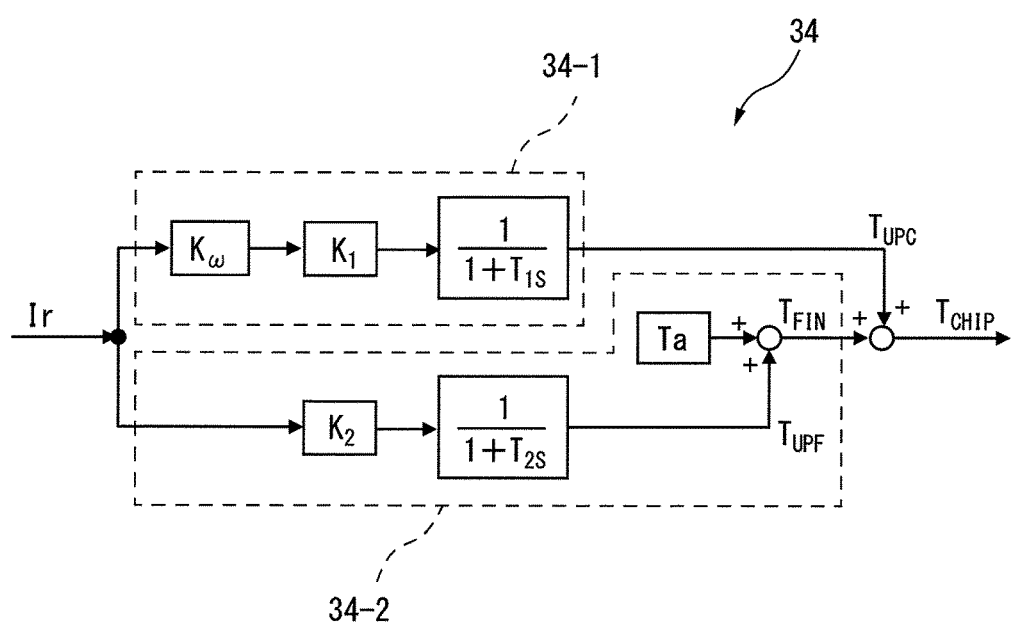
FIG. 6 is a block diagram illustrating a temperature calculation unit calculating junction temperature of a power device at the time of applying voltage to a motor.

FIG. 6 is a block diagram illustrating the temperature calculation unit calculating junction temperature of the power device at the time of applying voltage to a motor. When the voltage (output voltage from the power supply unit 31) applied to the AC motor 2 from the motor driving apparatus 1000 changes, heat generation (loss) of the power device changes, i.e., a heating coefficient changes. A calculating method of junction temperature with an example in which voltage Vx [V] is applied to the AC motor 2 is described herein.

The temperature calculation unit 34 includes a chip temperature calculation unit 34-1 and a radiator temperature calculation unit 34-2. The value of current supplied to the AC motor from the motor driving apparatus is detected by the current detection unit (not depicted), and is represented by a current feedback value Ir [Arms]. "rms" means an effective value. Ambient air temperature $T_a$ of the motor driving apparatus 1000 is detected by a temperature sensor (not depicted) installed close to the motor driving apparatus 1000.

In the chip temperature calculation unit 34-1 in the temperature calculation unit 34, temperature rise $T_{UPC}$ [° C.] of the chip against a fin (radiator) is obtained by integrating a value obtained by multiplying current feedback value Ir [Arms] by a power supply frequency coefficient $K_\omega$ and a heating coefficient $K_1$ [° C./Arms], with a tip side time constant $T_1$. The power supply frequency coefficient $K_\omega$ is a fixed value depending on a power supply frequency, and may be a value from "1.55" to "2.00" as an example. The heating coefficient $K_1$ [° C./Arms] is a value depending on output current and output voltage, and may be an increasing rate from 40 to 60 [° C.] per maximum current rating $I_{max}$, as an example. The tip side time constant $T_1$ is a value depending on the power device, and may be 100 to 300 [ms], as an example.

In the radiator temperature calculation unit 34-2 in the temperature calculation unit 34, temperature rise $T_{UPF}$ [° C.] of the fin (radiator) against the outside air is obtained by integrating a value obtained by multiplying the current feedback value Ir [Arms] by a heating coefficient $K_2$ [° C./Arms] with a fin side time constant $T_2$. The fin temperature (temperature of a radiator) [° C.] $T_{FIN}$ is obtained by adding ambient air temperature $T_a$ of the motor driving apparatus 1000 to the temperature rise $T_{UPF}$ [° C.] of the fin (radiator) against the outside air. The heating coefficient $K_2$ [° C./Arms] is a value depending on a type of an inverter (amplifier) which consists the power supply unit 31 and a PWM frequency, and may be an increasing rate from 65 to 100 [° C.] per 30-minute current rating $I_{30}$, as an example. The fin side time constant $T_2$ is a value depending on an amplifier configuration of the inverter in the power supply unit 31, and may be 70 to 150 [sec], as an example.

The junction temperature $T_{CHIP}$ [° C.] of the power device is obtained by adding the temperature rise $T_{UPC}$ [° C.] of the chip against the fin (radiator) computed by adding the chip temperature calculation unit 34-1 and the fin temperature (temperature of a radiator) $T_{FIN}$ [° C.] computed by the radiator temperature calculation unit 34-2.

In this way, the junction temperature of the power device is computed by the temperature calculation unit 34 in the present embodiment. As an alternative example, the junction temperature of the power device may be directly measured by a temperature sensor installed close to the power device. Although a method for computing the junction temperature of the power device by the temperature calculation unit 34 may not taking into account variation of respective power devices in characteristic data such as the heating coefficient of the power device and a heat time constant of the chip, directly measuring the junction temperature of the power device by using a temperature sensor increases the accuracy of the measured temperature.

The state observation unit 11 in the machine learning apparatus 1 observes the state variable constituted by the data regarding the number of times of switching of the power device acquired from the number of times of switching acquisition unit 32, the data regarding junction temperature of the power device acquired from the temperature calculation unit 34, and the data regarding presence or absence of a failure of the power device acquired from the failure determination unit 33.

The learning unit 12 in the machine learning apparatus 1 includes the reward computation unit 21 and the function update unit 22, and learns the predicted life of the power device in accordance with the training data set generated on the basis of the state variable observed by the state observation unit 11.

The reward computation unit 21 in the learning unit 12 computes the reward on the basis of the number of times of switching of the power device and the presence or absence of the failure of the power device, which are observed by the state observation unit 11. For example, the reward computation unit 21 decreases the reward when the number of times of switching of the power device observed by the state observation unit 11 exceeds a specified number of times, since this means that the number of times of switching exceeds "durable number of times of switching" corresponding to the life of the power device. The reward computation unit 21 also decreases the reward when a failure of the power device occurs under a state in which the number of times of switching of the power device does not exceed the specified number of times.

The function update unit 22 in the learning unit 12 updates the functions (action value table) for computing the predicted life of the power device, on the basis of the state variable observed by the state observation unit 11 and the reward computed by the reward computation unit 21.

The decision-making unit 13 computes the predicted life of the power device, on the basis of the result of learning by the learning unit 12 in accordance with the training data set, in response to an input of the present state variable. As described above, the life (number of times of switching) of the power device depends on the difference (power cycle) between the junction temperature at the time of operation of the power device and base temperature, and the difference between the junction temperature and the base temperature changes depending on the operating conditions and ambient air temperature of the motor driving apparatus. The decision-making unit 13 then determines the predicted life of the power device with reference to previous data regarding difference of junction temperature and base temperature and fault data, from the functions (action value table) generated (updated) in the function update unit 22 on the basis of the number of times of switching of the power device, the junction temperature of the power device, and the presence or absence of the failure of the power device, which are observed by the state observation unit 11. Since reinforcement learning is used for a learning algorithm as an example in the present embodiment, the function update unit 22 in the learning unit 12 updates the functions for computing the predicted life on the basis of the reward computed by the reward computation unit 21 in learning unit 12, and the decision-making unit 13 selects and outputs the predicted life which achieves the greatest reward on the basis of the updated functions. The predicted life decided by the decision-making unit 13 is output to the notification unit 14.

The notification unit 14 notifies the operator of the predicted life computed by the decision-making unit 13. In addition, the notification unit 14 may be configured to notify the operator of information prompting replacement of a power device on the basis of the predicted life computed by the decision-making unit 13. The operator can know the predicted life of the power device by the notification unit 14, and therefore, the operator can replace the power device before the power device becomes unoperatable. Replacing the power device at appropriate time becomes possible, whereby an unnecessary design margin can be reduced and inventory of power devices can be reduced. Alternatively, an operation state which has large influence on the life of the power device obtained when computing the predicted life may be additionally notified as a notification content of the notification unit 14. This enables the operator to take a measure in which the operation state which has the influence on the life of the power device is changed. For example, a designer can take a measure in which the periphery environment of the motor driving apparatus 1000 is improved so that temperature is an appropriate temperature for extending the life of a power device, or a measure in which operating conditions, such as output voltage, output current, or a switching frequency, are changed.

The notification unit 14 may be, for example, a display of a personal computer, a portable terminal, a touch panel, or the like, or a display which is an attachment of the motor driving apparatus 1000, or the like, and the notification unit 14 can display, for example, the predicted life on the display by characters or graphic. The notification unit 14 may be implemented by, for example, audio equipment which generates sounds, such as a speaker, a buzzer, and a chime. Alternatively, the notification unit 14 may be configured to display data on a paper sheet or the like by printing out using a printer. Alternatively, the notification unit 14 may be implemented by combining these configurations.

Figure 7:
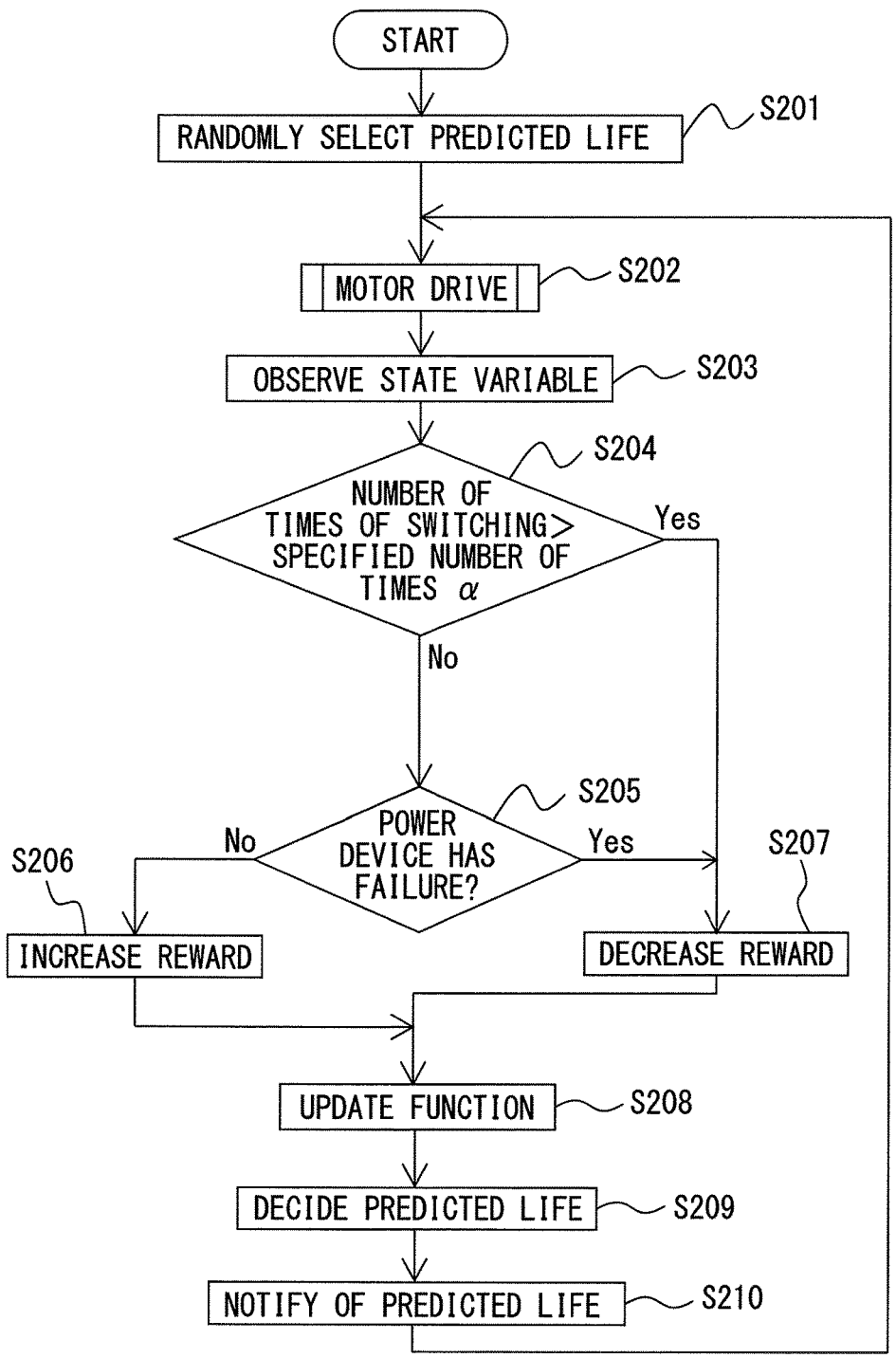
FIG. 7 is a flowchart illustrating an operational flow of the life prediction apparatus including the machine learning apparatus to which reinforcement learning is applied, according to the embodiment.

FIG. 7 is a flowchart illustrating an operational flow of the life prediction apparatus including the machine learning apparatus to which reinforcement learning is applied, according to the embodiment.

In general, an initial value for the action is randomly selected in reinforcement learning. In this embodiment, in step S201, predicted life defined as an action is randomly selected.

In step S202, the motor control unit 50 generates a switching command for controlling the velocity, torque, or rotor position of the AC motor 2, on the basis of control software stored in the motor control unit 50, by using information such as a predetermined speed command, an operation program for the AC motor 2, AC current and or AC voltage output from the power supply unit 31, and rotational speed and/or a rotor position of the AC motor 2. On the basis of the switching command generated in the motor control unit 50, the power supply unit 31 controls the switching operation of the power device, and converts DC power into AC power to supply the AC power to the AC motor. The AC motor 102 thus operates on the basis of the variable-voltage and -frequency three-phase AC power supplied. During this operation, the number of times of switching acquisition unit 32 obtains the data regarding the number of times of switching on the basis of the switching command for ON/OFF driving of the power device generated by the motor control unit 50, and the failure determination unit 33 obtains the data regarding the presence or absence of the failure of the power device on the basis of the switching command for the power device generated by the motor control unit 50 and AC power output from the power supply unit 31. The temperature calculation unit 34 calculates junction temperature $T_{CHIP}$ of the power device on the basis of the temperature of the fin cooling the power device, the ambient air temperature of the motor driving apparatus 1000, the value of current supplied to the AC motor 2 from the motor driving apparatus 1000, and the value of voltage applied to the AC motor 2 from the motor driving apparatus 1000, but as an alternative example, a temperature sensor may measure the junction temperature of the power device.

In step S203, the state observation unit 11 observes the state variable constituted by the data regarding the number of times of switching of the power device acquired from the number of times of switching acquisition unit 32, the data regarding junction temperature of the power device acquired from the temperature calculation unit 34, and the data regarding presence or absence of a failure of the power device acquired from the failure determination unit 33.

Subsequently, in step S204, the state observation unit 11 discriminates whether the observed number of times of switching of the power device exceeds a specified number of times α. When it is determined that the number of times of switching of the power device exceeds the specified number of times α, the reward computation unit 21 decreases a reward in step S207. On the other hand, when it is determined that the number of times of switching of the power device does not exceed the specified number of times α, it proceeds to step S205.

In step S205, the state observation unit 11 determines whether the power device has a failure on the basis of data regarding presence or absence of the failure of the power device. When it is determined that the power device has no failure, the reward computation unit 21 increases a reward in step S206. On the other hand, when it is determined that the power device has a failure, the reward computation unit 21 decreases the reward in step S207.

At step S208, the function update unit 22 updates the functions (action value table) for computing the predicted life of the power device on the basis of the state variable observed by the state observation unit 11 and the reward computed by the reward computation unit 21.

In subsequent step S209, the decision-making unit 13 selects and outputs the predicted life of the power device which achieves the greatest reward on the basis of the functions updated in step S208. The predicted life decided by the decision-making unit 13 is output to the notification unit 14.

In step S210, the notification unit 14 notifies the operator of the predicted life computed by the decision-making unit 13. Alternatively, the notification unit 14 notifies the operator of information prompting replacement of a power device on the basis of the predicted life computed by the decision-making unit 13.

Thereafter, the processing returns to step S202. The processes in steps S202 to S209 are repeated thereafter until a power device is replaced by an operator. With this operation, the machine learning apparatus 1 learns the predicted life of the power device. Note that training data sets may be acquired from a plurality of motor driving apparatuses 1000, and in this case, the learning unit 12 repeats the processes in steps S201 to S208 in accordance with the training data sets acquired for the plurality of motor driving apparatuses, to learn the predicted life. Acquired training data sets for the plurality of motor driving apparatuses improve the learning accuracy of the machine learning apparatus 1.

Next, the machine learning apparatus 1 is described in more detail. The machine learning apparatus 1 has functions of extracting a useful rule, a knowledge representation, a decision criterion and the like by analysis from a set of data items input into the apparatus, outputting the decision result, and learning knowledge. As described above, the learning algorithm in the machine learning apparatus 1, are generally classified into "supervised learning", "unsupervised learning", and "reinforcement learning". In addition, for implementing these techniques, there is a technique which learns extraction of the feature quantity itself, called "deep learning". Such machine learning (the machine learning apparatus 1) is implemented by applying, for example, GPGPU (General-Purpose computing on Graphics Processing Units), a large-scale PC cluster, or the like.

"Supervised learning" provides a pair of a certain input data and a result (label) data to the machine learning apparatus 1 in large quantities to learn the feature in the data sets, and inductively obtains a model for estimating a result from an input, i.e., the relationship. When applying the supervised learning to the present embodiment, the supervised learning can be used for a component computing predicted life of a power device. This is implementable using an algorithm such as a neural network described below.

"Unsupervised learning" provides only input data to the machine learning apparatus 1 in large quantities, thereby learning distribution aspects of the input data and learning an apparatus performing compression, classification, shape, or the like on the input data, without providing corresponding supervised output data. For example, unsupervised learning can perform clustering of features in the data sets into sets each having similar feature. Providing a certain criteria and assigning an output which optimizes the criteria using the clustering result allows a prediction of an output.

There is an issue between "unsupervised learning" and "supervised learning", called "semi-supervised learning", in which there are only certain pairs of input data and output data and there are only input data (e.g., simulation data) with respect to other parts. In the present embodiment, data acquirable without actually operating the motor driving apparatus is used in unsupervised learning, to thereby achieve efficient learning.

First, an example applying reinforcement learning as a learning algorithm in the machine learning apparatus 1 is described.

Issues in reinforcement learning are considered as follows.

The motor driving apparatus observes an environmental state and determines action.

Environment may change in accordance with a certain rule, and also own action may cause environment to change.

A reward signal is returned for each action.

The total of the rewards (discounts) over the future is intended to maximize.

Start learning from a state in which a result caused by action is not known at all, or is imperfectly known. In other words, the motor driving apparatus can obtain a result as data only after actually starting the operation. Also in other words, it is necessary to search for the optimal action by trial and error.

An initial state may be set to a state in which prior learning (technique of above-described supervised learning and inverse reinforcement learning) has been performed so that an operation of human might be imitated, and learning may be started from a better start point.

"Reinforcement learning" is a method which learns not only decisions and classifications but also action, to thereby learn appropriate action taking interaction between environment and action into consideration, i.e., to learn for maximizing the reward to be obtained in the future. This represents that the present embodiment can obtain action which may have influence to the future such that predicted life of a power device is computed accurately. For example, description is continued with applying Q learning, but it is not limited to this.

Q learning is a method of learning a value Q (s, a) for selecting of action a under a certain environmental states. In other words, action a with the highest value Q (s, a) may be selected as the optimal action in a certain state s. However, with respect to the combination of a state s and action a, the true value of the value Q (s, a) is not known at all at first. Then, an agent (action subject) selects various actions a under a certain state s, and receives rewards for actions a at the time. In this way, the agent learns selection of better action, i.e., the true value Q, (s, a).

Further, the total of the rewards to be obtained over the future is intended to maximize as a result of action, and therefore, final goal is that $Q(s, a)=E[\Sigma \gamma^t r_t]$ is established. It is assumed that an expected value is taken when a state changes in accordance with the optimal action, but it is learned while searching since it is not known yet. An update equation of such value Q (s, a) can be represented by Equation 1, for example.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In above-described Equation 1, $s_t$ denotes a state of environment at time t, and $a_t$ denotes action at time t. A state changes to $s_{t+1}$ by the action $a_t$. $r_{t+1}$ denotes a reward which can be given by the change of the state. The term with "max" corresponds to a value obtained by multiplying Q value by γ, the Q value being the highest Q value among the known Q values at the time of selecting action a having the highest Q value under the state $s_{t+1}$. γ is a parameter which satisfies $0<\gamma \leq 1$, and is called a discount rate. α is a learning coefficient and is a value within a range $0<\alpha \leq 1$.

Equation 1 represents a method of updating an evaluation value Q ($s_t$, $a_t$) of action $a_t$ in a state $s_t$ on the basis of a reward $r_{t+1}$ returned as a result of a trial $a_t$. The equation represents that, when the evaluation value Q ($s_{t+1}$, max $a_{t+1}$) of the reward $r_{t+1}$+best action max a in the subsequent state according to the action a is larger than the evaluation value Q ($s_t$, $a_t$) of the action a in the state s, Q ($s_t$, $a_t$) is increased, and when it is smaller on the contrary, Q ($s_t$, $a_t$) is decreased. In other words, a value of a certain action in a certain state is made closer to a reward immediately returned as a result and a value of the best action in the subsequent state according to the action.

The expression modes of Q (s, a) on a computer includes a method of holding the value Q for all the state action pairs (s, a) in a table (action value table), and a method of preparing a function which approximates Q (s, a). In the latter method, the above-described update equation is implementable by adjusting parameters of an approximation function with techniques, such as probability gradient descent. A neural network described below can be used as the approximation function.

Figure 8:
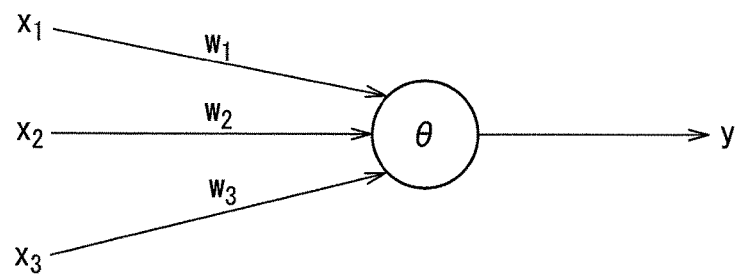
FIG. 8 is an exemplary diagram illustrating a model of a neuron.

A neural network can be used as an approximation algorithm of a value function in supervised learning, unsupervised learning, and reinforcement learning. The neural network includes an arithmetic unit, a memory, and the like, which implement, for example, the neural network corresponding to a model of a neuron as illustrated in FIG. 8. FIG. 8 is an exemplary diagram illustrating a model of a neuron.

As illustrated in FIG. 8, a neuron outputs an output y for a plurality of inputs x (input x1 to input x3 in FIG. 8, as an example). The inputs x1 to x3 are weighted by weights w (w1 to w3) corresponding to the inputs x, respectively. In this way, the neuron outputs the output y expressed by Equation 2. Note that all of inputs x, output y, and weights w are vectors. In the following Equation 2, θ denotes a bias and $f_k$ denotes an activating function.

$$y = f_k(\Sigma_{i=1}^n x_i w_i - \theta) \quad (2)$$

Next, a neural network including weights of three layers which combines the neuron described above is described with reference to FIG. 9. FIG. 9 is an exemplary diagram illustrating a neural network including weights of three layers, D1 to D3.

As illustrated in FIG. 9, a plurality of inputs x (input x1 to input x3 as an example) are input from the left side of the neural network, and results y (result y1 to result y3 as an example) are output from the right side.

Specifically, the input x1 to input x3 are weighted by corresponding weights, respectively, and input into each of three neurons N11 to N13. These weights applied to the inputs are collectively referred to as w1.

The neurons N11 to N13 output z11 to z13, respectively. In FIG. 9, these z11 to z13 are collectively referred to as a feature vector z1, which can be regarded as a vector including extracted feature quantity of the input vector. This feature vector z1 is a feature vector between the weight w1 and the weight w2. The z11 to z13 are weighted by corresponding weights, respectively, and input into each of two neurons N21 and N22. These weights applied to the feature vector are collectively referred to as w2.

The neurons N21 and N22 output z21 and z22, respectively. In FIG. 9, these z21 and z22 are collectively referred to as a feature vector z2. This feature vector z2 is a feature vector between the weight w2 and the weight w3. The feature vector z21 and z22 are weighted by corresponding weights, respectively, and input into each of three neurons N31 to N33. These weights applied to the feature vector are collectively referred to as w3.

Finally, the neurons N31 to N33 output results y1 to y3, respectively.

The operation of the neural network includes a learning mode and a value prediction mode. For example, weights w are learned using learning data sets in the learning mode, and an action decision in the motor driving apparatus is made using a learned parameter in the prediction mode. Although it is written as prediction for convenience, it is needless to say that various tasks, such as detection, classification, and reasoning, are possible.

It may be possible to immediately learn the data obtained by actually operating the motor driving apparatus in the prediction mode to reflect the data to the subsequent action (online learning), or alternatively, it may be possible to perform collective learning using a previously collected data group, and perform a detection mode (batch learning) with the parameters thereafter. Alternatively, as its intermediate aspect, it is also possible to insert a learning mode whenever data accumulates to some extent.

The weights w1 to w3 can be learned by backpropagation. Information on error is input from right side, and flows to left side. The backpropagation is a technique of adjusting (learning) each weight so as to decrease the difference between an output y when an input x is input and a true output y (teacher) for each neuron.

Such a neural network can further increase the number of layers, i.e., to three or more layers (called as deep learning). It is possible to automatically obtain an arithmetic unit which performs feature extraction on an input step by step and returns a result only from supervised data.

The machine learning apparatus 1 of the present embodiment includes, in order to implement above-described Q learning, a state observation unit 11, a learning unit 12, and a decision-making unit 13, for example as illustrated in FIG. 5. However, a machine learning method applied to the present invention is not limited to Q learning as described above. In other words, various techniques, such as "supervised learning", "unsupervised learning", "semi-supervised learning", and "reinforcement learning", which can be used by the machine learning apparatus are applicable. Such machine learning (machine learning apparatus 1) is implementable by applying GPGPU, a large-scale PC cluster or the like, for example. For example, when applying supervised learning, a value function corresponds to a learning model and a reward corresponds to an error. It is also possible to use a function approximated by using the above-described neural network as the action value table, and this is especially effective when s and a have a huge amount of information.

Next, an example applying supervised learning as a learning algorithm in the machine learning apparatus 1 is described.

Figure 10:
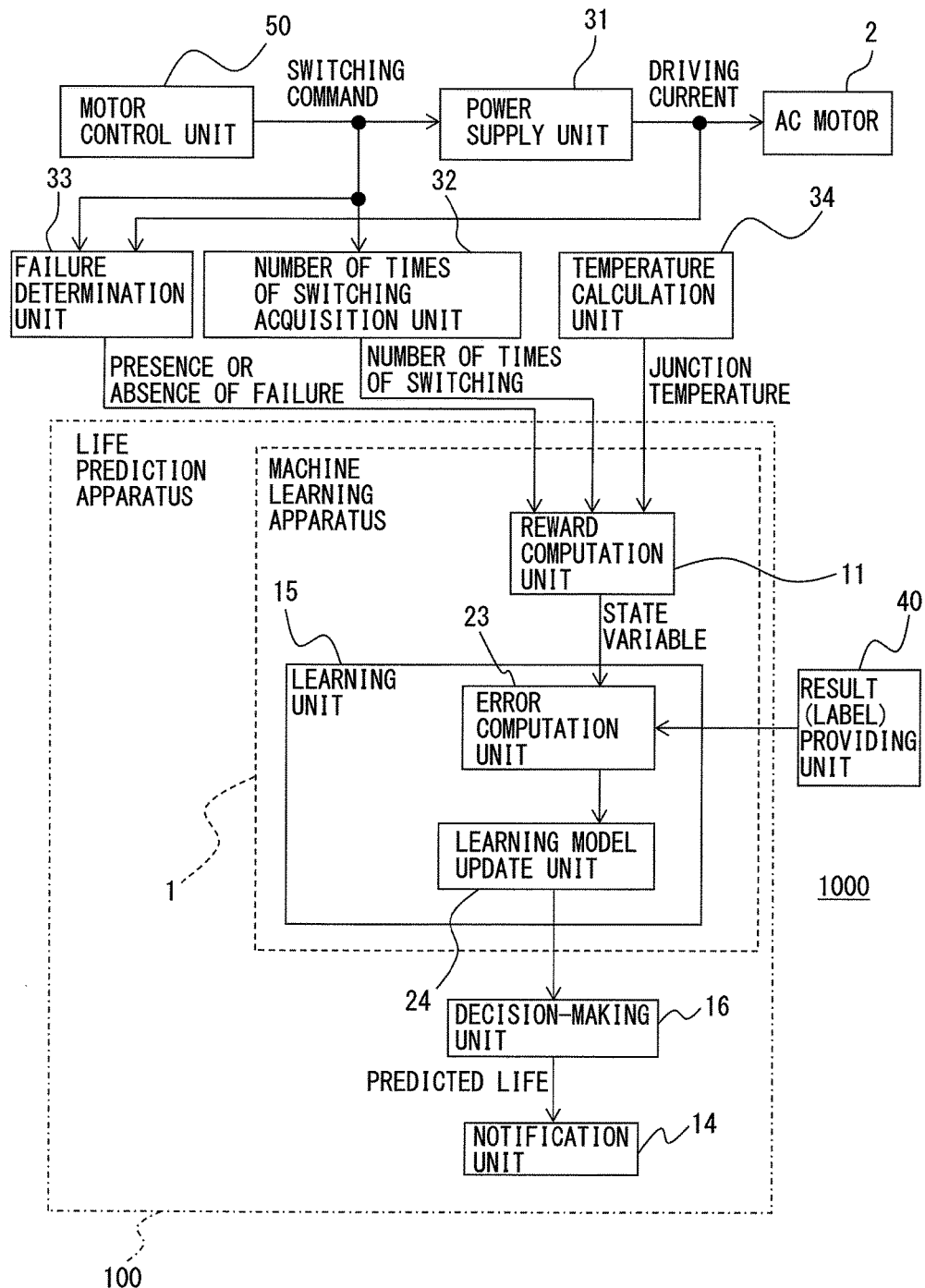
FIG. 10 is a principle block diagram illustrating a life prediction apparatus including the machine learning apparatus to which supervised learning is applied, and a motor driving apparatus including the life prediction apparatus, according to the embodiment.

FIG. 10 is a principle block diagram illustrating a life prediction apparatus including the machine learning apparatus to which supervised learning is applied, and a motor driving apparatus including the life prediction apparatus, according to the embodiment. As is clear from comparison between FIG. 10 and FIG. 5 described above, the motor driving apparatus including a motor control apparatus including the machine learning apparatus illustrated in FIG. 10 to which supervised learning is applied further includes a result (label) providing unit 40, in addition to the motor control apparatus including the machine learning apparatus illustrated in FIG. 5 to which Q learning (reinforcement learning) is applied. The machine learning apparatus 1 in FIG. 10 includes a state observation unit 11, a learning unit 15 provided with an error computation unit 23 and a learning model update unit 24, and a decision-making unit 16.

In the motor control apparatus including the machine learning apparatus illustrated in FIG. 10 to which supervised learning is applied, the error computation unit 23 and the learning model update unit 24 correspond to the reward computation unit 21 and the function update unit 22, respectively, in the motor control apparatus illustrated in FIG. 5 to which Q learning is applied. However, the error computation unit 23 is configured to input a result (label) from the result providing unit 40. Other components are the same as those in FIG. 5 described above, and the description thereof is omitted.

The result providing unit 40 provides (inputs) data with a label (result) to the error computation unit 23 of the learning unit 15; the error computation unit 23 receives the data with the label from the result providing unit 40 and a signal from the state observation unit 11 to perform error computation; and the learning model update unit 24 updates the learning model. For example, when the processes by the motor driving apparatus 1000 are the same, the result providing unit 40 may hold, for example, the data with a label obtained by the day before the predetermined day on which the motor driving apparatus 1000 is driven, and may provide the data with the label held in the result providing unit 40 to the error computation unit 23 on the predetermined day.

Alternatively, it is possible to provide data obtained by simulation or the like performed outside the motor driving apparatus 1000, or data with a label of other motor driving apparatus to the error computation unit 23 of the motor driving apparatus 1000 through a memory card or a communication line. Further, the result providing unit 40 may be configured by a nonvolatile memory, such as a flash memory, the result providing unit (nonvolatile memory) 40 may be embedded in the learning unit 15, and the data with the label held in the result providing unit 40 may be used by the learning unit 15 as it is.

As for the operation of the machine learning apparatus 1 included in the motor driving apparatus 1000 illustrated in FIG. 10, in order to acquire the predicted life of the power device, the error computation unit 23, for example, computes the error on the basis of the state variable from the result that is input from the result providing unit 40, and updates the learning model in the learning model update unit 24.

Note that the machine learning apparatus 1 is not limited to an apparatus to which above-described reinforcement learning (for example, Q learning) or supervised learning is applied, and various types of algorithm for machine learning are applicable.

The state observation unit 11, the learning units 12 and 15, and the decision-making units 13 and 16 described above may be constructed in, e.g., the software program form or constructed by a combination of various electronic circuits and software programs. When, for example, these units are constructed in the software program form, the function of each of the above-described units is implemented by operating the arithmetic processing unit in the motor driving apparatus 1000 in accordance with the software program, or by operating the software program on a cloud server. Alternatively, the machine learning apparatus 1 including the state observation unit 11 and the learning units 12 and 15 may be implemented as a semiconductor integrated circuit in which a software program for implementing the function of each unit is written. Or again, a semiconductor integrated circuit in which a software program for implementing the function of each unit is written may be implemented to include the decision-making units 13 and 16, as well as the machine learning apparatus 1 including the state observation unit 11 and the learning units 12 and 15.

Since machine learning processing is performed using data detected by a sensor intrinsically mounted in the motor control apparatus 1000 to control driving of the AC motor 2, this involves no new hardware device as in the conventional technique, and this configuration is, therefore, also applicable to an existing motor driving apparatus by retrofitting. In this case, it suffices to equip the existing motor driving apparatus with a semiconductor integrated circuit in which a software program for implementing the function of each unit including the machine learning apparatus 1 and the decision-making units 13 and 16 is written, or to additionally install, on the arithmetic processing unit in the existing motor driving apparatus, a software program for implementing the function of each unit of the machine learning apparatus 1 and the decision-making units 13 and 16. Further, a machine learning apparatus 1 having learned the predicted life regarding the power device in a certain motor driving apparatus may be mounted in another motor driving apparatus to re-learn and update predicted life regarding a power device in the another motor driving apparatus.

According to the present invention, it is possible to implement a machine learning apparatus and method which can accurately easily predict predicted life of a power device, and a life prediction apparatus and motor driving apparatus including the machine learning apparatus.

According to the machine learning apparatus and method in the present invention, the predicted life of the power device in the power supply unit in the motor driving apparatus is learned while actually operating the motor driving apparatus, and therefore the accurate predicted life depending on an actual use condition is learned. According to the life prediction apparatus and the motor driving apparatus including the machine learning apparatus in the present invention, accurate predicted life depending on an actual use condition can be easily calculated. With this configuration, an operator can know accurate predicted life of the power device, and therefore, the power device can be replaced before the power device becomes unoperatable, and the timing for replacement of the power device is not missed, whereby a serious accident resulting from a failure of a power device or life arrival can be prevented. When replacing the power device at appropriate time becomes possible in this way, an unnecessary design margin can be reduced and inventory of power devices can be reduced. Since an operation state which has large influence on the life of the electric motor obtained when computing the predicted life can be detected, a measure can be taken in which the operation state which has the influence on the life of the power device is changed. For example, a designer can take a measure in which the periphery environment of the motor driving apparatus is improved so that temperature is an appropriate temperature for extending the life of a power device, or a measure in which operating conditions, such as output voltage, output current, or a switching frequency, are changed.

What is claimed is:
1. A machine learning apparatus that learns a predicted life of a power device of a motor driving apparatus that converts DC power into AC power by a switching operation of the power device to supply the AC power to an AC motor, the machine learning apparatus comprising:
 a state observation processor to sample a state variable indicative of a state of the motor driving apparatus, the state variable having an effect on the life of the motor driving apparatus, the state variable being one or more of: data regarding a number of times of switching of the power device, data regarding a junction temperature of the power device, and data regarding at least one of: presence and absence of a failure of the power device;
 wherein data regarding the number of times of switching of the power device is obtained by the state observation processor in response to receiving a switching command for ON/OFF driving of the power device generated by the motor driving apparatus;
 wherein data regarding at least one of presence and absence of the failure of the power device is obtained by the state observation processor in response to receiving the switching command for the power device generated by the switching operation of the motor driving apparatus and AC power output from the power device, the AC power output being detected by a current detector;
 wherein data regarding the junction temperature of the power device is obtained by the state observation processor based on: a temperature of a fin cooling the power device detected by a first temperature sensor, ambient air temperature of the motor driving apparatus detected by a second temperature sensor, a value of current supplied to the AC motor from the motor driving apparatus and detected by the current detector, and a value of voltage applied to the AC motor from the motor driving apparatus,
 the state observation processor being in communication with the first temperature sensor and the second temperature sensor to receive the measured temperature of the fin cooling the power device and the ambient air temperature,
 the state observation processor being in communication with the current detector to receive the AC power output and/or the current supplied to the AC motor detected by the current detector; and a learning processor in communication with the state observation processor, the learning processor to learn the predicted life of the power device based on the state variable;

wherein the learning processor:
determines a function for computing the predicted life of the power device, each function being associated with a reward obtainable by the learning processor, determines the function corresponding to a maximum value of the reward, and
changes one or more operating and/or environmental parameters of the motor driving apparatus based on the predicted life of the power device.

2. The machine learning apparatus according to claim 1, wherein the learning processor is configured to:
compute a reward based on:
the number of times of switching of the power device; and
at least one of: the presence and absence of the failure of the power device; and
updates, based on the state variable and the reward, the function for computing the predicted life of the power device;
wherein the reward is decreased when at least one of:
the number of times of switching of the power device exceeds a specified number of times; and
a failure of the power device occurs under a state in which the number of times of switching of the power device does not exceed the specified number of times.

3. The machine learning apparatus according to claim 1, wherein the learning processor is configured to perform:
an error computation to compute an error on the basis of the state variable.

4. The machine learning apparatus according to claim 1, wherein the learning processor is configured to learn the predicted life of the power device in accordance with a training data set acquired for a plurality of motor driving apparatuses, the training data set comprising the state variable as an input and the predicted life of the power device as a result.

5. A life prediction apparatus for a power device in the motor driving apparatus, the life prediction apparatus comprising the machine learning apparatus according to claim 1, wherein the life prediction apparatus further comprises:
a decision-making processor in communication with the learning processor, the decision-making processor computing the predicted life of the power device, on the basis of the function function updated by the learning processor at an end of learning, in response to an input of a present state variable.

6. The machine learning apparatus according to claim 2, wherein the learning processor updates the function for computing the predicted life of the power device on the basis of the state variable and the reward in accordance with a neural network model.

7. The life prediction apparatus according to claim 5, further comprising:
a notification processor in communication with the decision-making processor, wherein the notification processor:
receives the predicted life of the power device from the decision-making processor; and
provides the predicted life computed by the decision-making processor as an output.

8. The life prediction apparatus according to claim 5, wherein the learning processor is configured to re-learn and update the predicted life of the power device in accordance with an additional training data set, the additional training data set comprising the state variable as an input and the predicted life of the power device as a result.

9. A motor driving apparatus comprising:
the life prediction apparatus according to claim 5;
a power supply in communication with the life prediction apparatus, the power supply converting DC power into AC power by a switching operation of the power device to supply the AC power to the AC motor;
wherein failure of the power device corresponds to a state when a value of current flowing into the AC motor is close to zero when the switching command has been provided to the power device, or when the value of current flowing into the AC motor does not correspond to an expected value of current based on the switching command provided to the power device.

10. The life prediction apparatus according to claim 7, wherein the notification processor further provides to an operator:
information for prompting replacement of the power device or replacement of the motor driving apparatus on the basis of the predicted life computed by the decision-making processor.

11. The motor driving apparatus according to claim 9, further comprising:
a temperature calculation processor in communication with the state observation processor, the temperature calculation processor calculating the junction temperature of the power device on the basis of the temperature of the fin cooling the power device, the ambient air temperature of the motor driving apparatus, the value of current supplied to the AC motor from the motor driving apparatus, and the value of voltage applied to the AC motor from the motor driving apparatus.

12. The motor driving apparatus according to claim 9, further comprising:
a temperature sensor measuring the junction temperature of the power device.

13. A machine learning method that learns a predicted life of a power device of a motor driving apparatus and converts DC power into AC power by a switching operation of the power device to supply the AC power to an AC motor, the machine learning method comprising:
sampling a state variable indicative of a state of the motor driving apparatus, the state variable being one or more of:
data regarding the number of times of switching of the power device,
data regarding junction temperature of the power device, and
data regarding at least one of:
presence and absence of a failure of the power device;
wherein data regarding the number of times of switching of the power device is obtained in response to a switching command for ON/OFF driving of the power device generated by the motor driving apparatus;
wherein data regarding at least one of presence and absence of the failure of the power device is obtained in response to receiving the switching command for the power device generated by the switching operation of the motor driving apparatus and AC power output from the power device detected by a current detector; and wherein data regarding a junction temperature of the power device is obtained based on: a temperature of a fin cooling the power device detected by a first temperature sensor, ambient air temperature of the motor driving apparatus detected by a second temperature sensor, a value of current supplied to the AC motor from the motor driving apparatus and detected by the current detector, and a value of voltage applied to the AC motor from the motor driving apparatus;

learning the predicted life of the power device in accordance with a training data set generated based on the state variable , the learning comprising:
  determining a function for computing the predicted life of the power device, each function being associated with an obtainable reward
  determining the function corresponding to a maximum value of reward; and
  changing one or more operating and/or environmental parameters of the motor driving apparatus based on the predicted life of the power device.

* * * * *